US010240508B2

(12) United States Patent
Barbely et al.

(10) Patent No.: US 10,240,508 B2
(45) Date of Patent: Mar. 26, 2019

(54) DECOUPLER FOR FLEXIBLE CONNECTION OF EXHAUST PIPES

(71) Applicant: American BOA, Inc., Cumming, GA (US)

(72) Inventors: Eric Barbely, Atlanta, GA (US); Rolf Janssen, Atlanta, GA (US); Srinivas Gade, Cumming, GA (US)

(73) Assignee: American BOA, Inc., Cumming, GA (US)

( * ) Notice: Subject to any disclaimer, the term of this patent is extended or adjusted under 35 U.S.C. 154(b) by 585 days.

(21) Appl. No.: 14/958,076

(22) Filed: Dec. 3, 2015

(65) Prior Publication Data

US 2016/0160733 A1   Jun. 9, 2016

Related U.S. Application Data

(60) Provisional application No. 62/089,450, filed on Dec. 9, 2014.

(51) Int. Cl.
| | |
|---|---|
| *F16L 23/12* | (2006.01) |
| *F01N 13/18* | (2010.01) |
| *F16L 27/10* | (2006.01) |
| *F16L 27/111* | (2006.01) |
| *F02M 35/10* | (2006.01) |
| *F16L 51/02* | (2006.01) |

(52) U.S. Cl.
CPC ...... *F01N 13/1811* (2013.01); *F01N 13/1816* (2013.01); *F02M 35/10354* (2013.01); *F16L 27/1004* (2013.01); *F16L 27/1021* (2013.01); *F16L 27/111* (2013.01); *F16L 51/026* (2013.01); *F16L 51/027* (2013.01); *F01N 2470/12* (2013.01)

(58) Field of Classification Search
CPC ........................................................ F16L 23/12
USPC .................................................. 285/401, 360
See application file for complete search history.

(56) References Cited

U.S. PATENT DOCUMENTS

| | | | |
|---|---|---|---|
| 4,911,482 | A | 3/1990 | Doat |
| 5,482,330 | A | 1/1996 | Holzhausen |

(Continued)

FOREIGN PATENT DOCUMENTS

| | | |
|---|---|---|
| DE | 4317334 C1 | 9/1994 |
| DE | 19530011 A1 | 2/1997 |

(Continued)

OTHER PUBLICATIONS

International Searching Authority, Search and Written Opinion Issued in Corresponding International Application No. PCT/IB2015/002327, 12 pages.

*Primary Examiner* — David Bochna
*Assistant Examiner* — James A Linford
(74) *Attorney, Agent, or Firm* — Wood Herron & Evans LLP (57) ABSTRACT

A decoupler includes a short bellows of ten or fewer convolutions, an internal liner spaced from the bellows internally and a cover spaced radially outward from the bellows providing an air gap both internally and externally of the bellows. The liner has a free-standing downstream end proximate a damper which is captured by a cover, inner damper ring and slide ring. Two decouplers are mounted in series to accommodate angular, axial and lateral displacement when operably connecting two end pipes and one central pipe.

9 Claims, 13 Drawing Sheets

(56) References Cited

U.S. PATENT DOCUMENTS

| | | | |
|---|---|---|---|
| 6,058,702 A * | 5/2000 | Jorg Alexnat | B60K 13/04 60/322 |
| 6,240,969 B1 | 6/2001 | Wildermuth | |
| 8,042,840 B2 | 10/2011 | Chahine et al. | |
| 8,500,172 B2 | 8/2013 | Turfait et al. | |
| 2009/0284006 A1 * | 11/2009 | Chahine | F01N 13/1811 285/229 |
| 2009/0309355 A1 * | 12/2009 | Turfait | F01N 13/1816 285/145.5 |

FOREIGN PATENT DOCUMENTS

| | | |
|---|---|---|
| DE | 4317334 C2 | 9/2003 |
| DE | 19549670 B4 | 3/2005 |
| WO | 9936685 A1 | 7/1999 |
| WO | 2009140397 A2 | 11/2009 |

* cited by examiner

DECOUPLER FOR FLEXIBLE CONNECTION OF EXHAUST PIPES

PRIORITY CLAIM

Applicant claims the benefit of the filing date of Dec. 9, 2014 for U.S. Provisional Patent Application Ser. No. 62/089,450 which application is incorporated herein by this express reference.

FIELD OF THE INVENTION

This invention relates to flexible couplings for pipes and more particularly to flexible couplings for exhaust and intake pipes used with an internal combustion engine.

BACKGROUND OF THE INVENTION

Flexible apparatus for coupling exhaust pipes from internal combustion engines are known, however prior devices present certain undesirable disadvantages. For example, it is typical for a prior coupler to be non-load bearing, thus requiring a system of support making necessary specific exhaust or intake system hangers or brackets for the connected pipes. Prior couplers use conventional bellows. When prior couplers use conventional bellows, high internal gas pressures can cause the coupler to grow in length or to "squirm". Conventional bellows cannot dampen system peripheral resonances to the extent desired. Conventional couplers allow escape of heat to periphery or other engines or automotive components. Prior couplers do not lend themselves to exterior insulation installation, and such, if done, must be flexible. The flexibility of prior couplers frequently involves use of elongated or lengthy bellows and a liner of strip-wound construction, potentially permitting bellow to liner contact. Also, prior coupling devices permit quicker component deterioration from high frequency fatigue failure. Thus known couplers inherently have numerous disadvantages and deficiencies.

SUMMARY OF THE INVENTION

These and other disadvantages are addressed in preferred embodiments of this invention which include a combination of elements performing together in a way to eliminate or reduce these noted prior deficiencies. As used herein, the term "decoupler" refers to apparatus coupling exhaust or intake pipes or conduits used in internal combustion systems.

Accordingly, one embodiment of the invention contemplates a leak tight flexible decoupler for use in exhaust or intake conduits and as a substitute or replacement for a conventional flexible coupling of the bellows and hose variety.

Thus one embodiment of the invention comprises a decoupler including a load bearing damper, a bellows, an inner tube and a cover, combined together in a single load bearing unit.

Preferably, the damper is supported internally on an annular inner damper ring configured for connection to one exhaust or intake tube. The cover is oriented on the outside surface of the damper and extends toward a distal decoupler end over the bellows, while the inner liner is a tube extending from the distal end back and radially inward of the bellows toward the damper. The distal end of the decoupler includes a portion of the cover, an end of the bellows and an end of the inner liner tube.

The bellows comprises a plurality of convolutions in limited number sufficient to comprise a short, stiff bellows with first modes being over critical for typical NVH environments. That is the decoupler thus eliminates high frequency fatigue failure risk compared to conventional, known, flexible couplings.

This construction provides two air gaps over the area coupled, reducing heat transfer to the outside of the cover and providing constant thermal performance in light of reduced axial growth or any "squirming" of the coupler due to thermal reaction. These gaps include the space between the cover and the bellows and the space between the bellows and the inner liner.

As such the invention provides an improved decoupler which is load bearing and among other advantages can be used in operably connecting two exhaust or intake pipes without additional or specific hangers. This decoupler is stiff enough to eliminate the need of special assembly fixtures or tools when a system of exhaust or intake pipes is assembled.

BRIEF DESCRIPTION OF THE DRAWINGS

These and other advantages will be readily appreciated from the following description of embodiments of the invention and from the drawings in which.

DETAILED DESCRIPTION OF THE INVENTION

Figure 1:
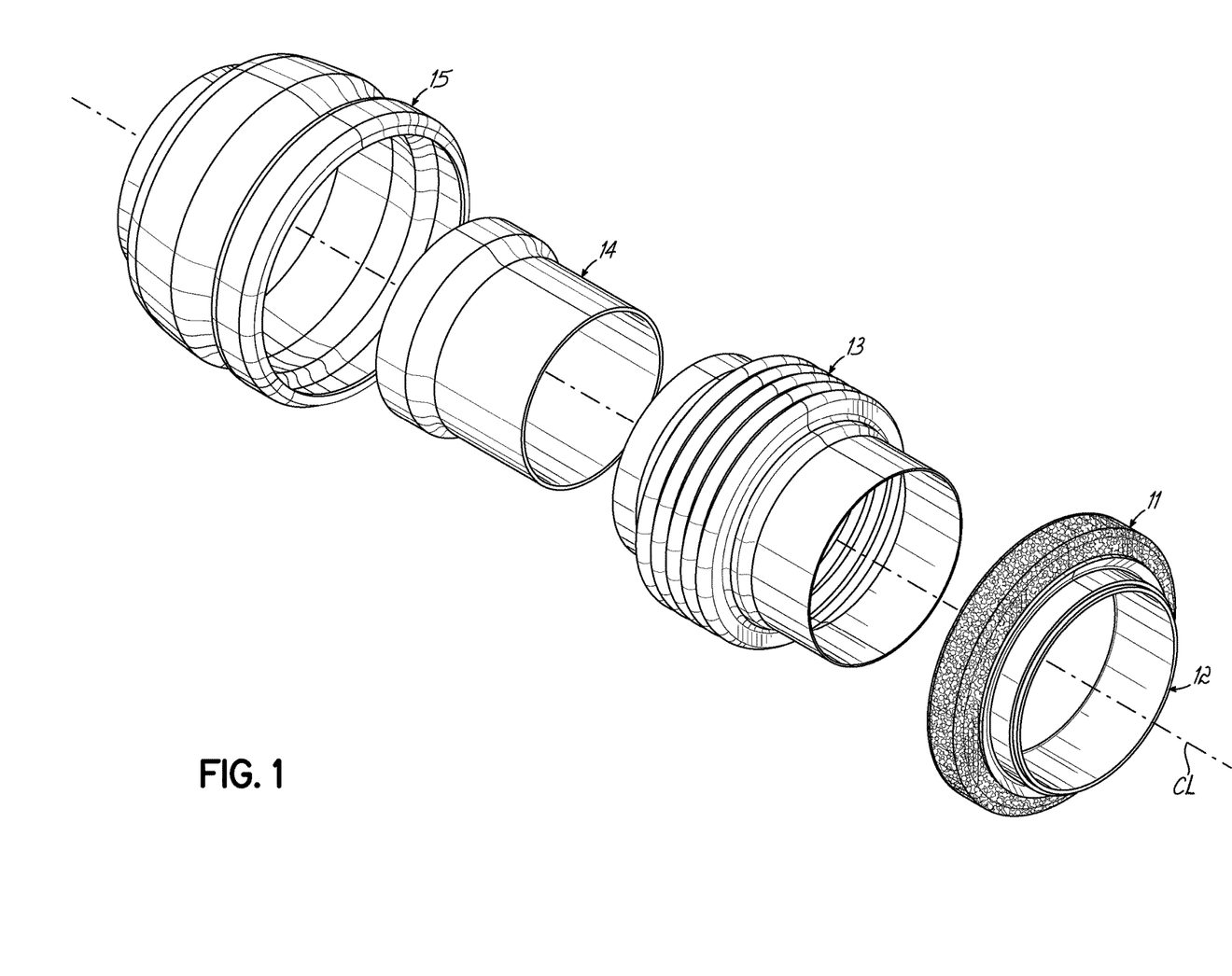
FIG. 1 is an exploded illustration of the decoupler of the invention.

Turning now to the drawings, FIG. 1 illustrates the components of a decoupler 10 in exploded view and comprising a load bearing damper 11 on an inner damper ring 12, a bellows 13, an inner liner tube 14 and a cover 15.

Figure 2:
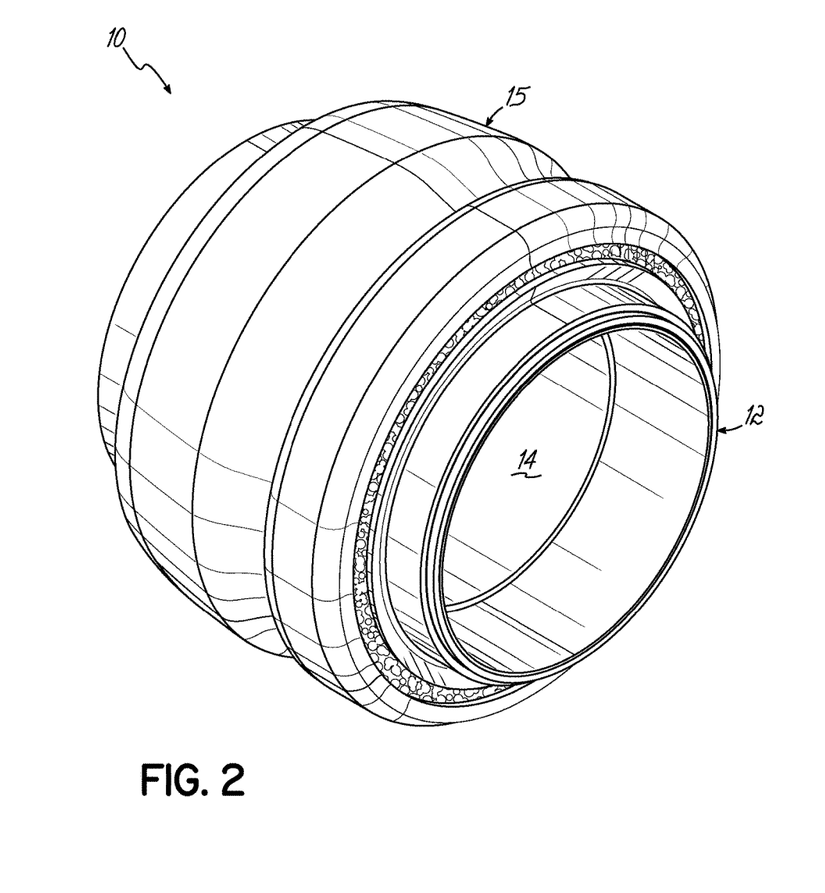
FIG. 2 is an illustration of the assembled decoupler components of FIG. 1.

FIG. 2 illustrates assembly of these components to define decoupler 10.

Figure 3:
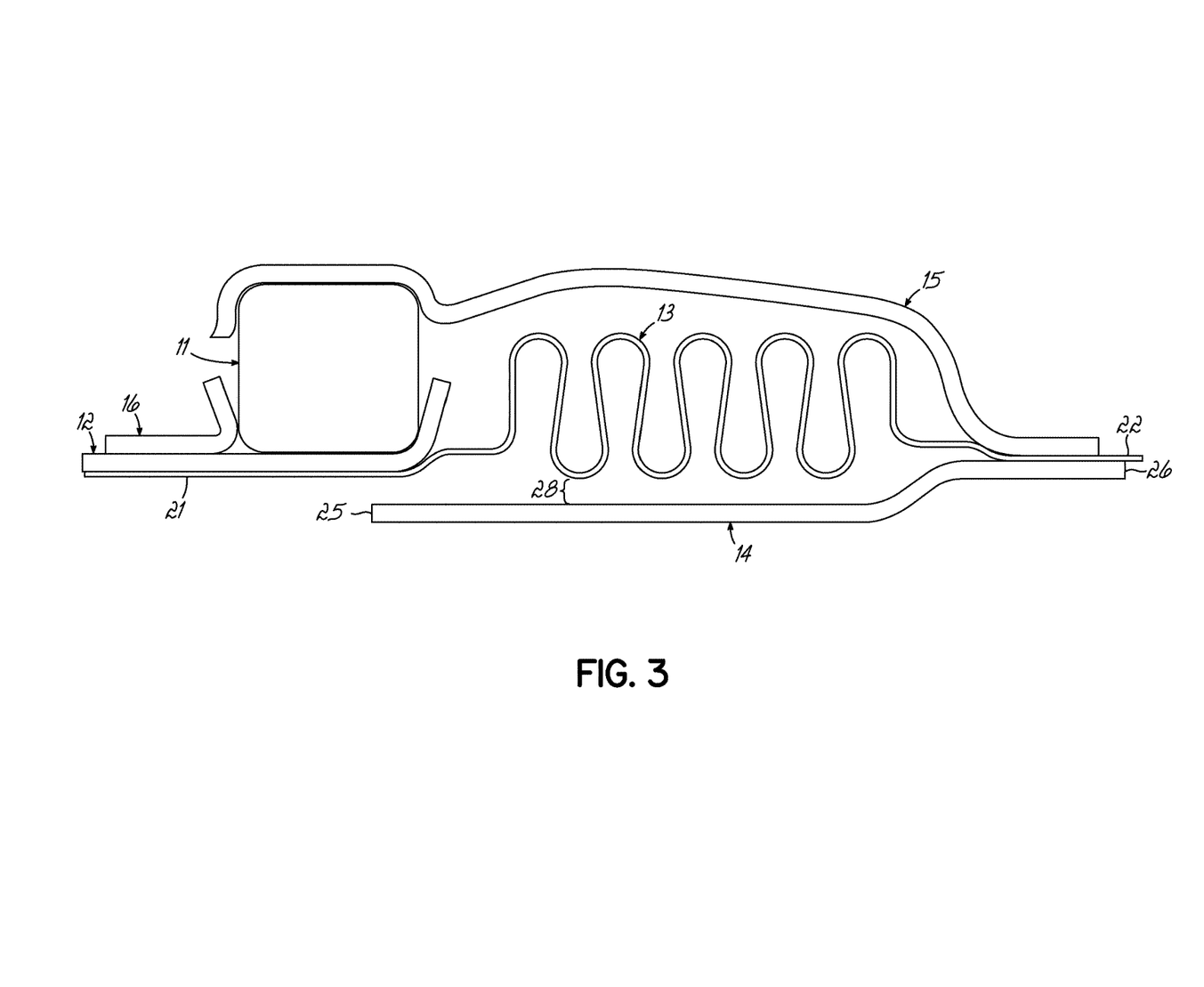
FIG. 3 is a partial cross-sectional illustration of the decoupler in FIGS. 1 and 2.

Turning to FIG. 3, a cross-section of assembled components of coupler 10 as in FIG. 2 is illustrated, including slide ring 16.

Cover 15 has an end 15a (FIG. 3A) configured to provide an annular upper pocket 17 for damper 11. Inner damper ring 12 includes a radially outward extending flange 18, so that ring 12 provides a lower pocket 19 for receiving an inner peripheral portion of damper 11. Upper pocket 17 and lower pocket 19 combine to define a fixed annular pocket supporting damper 11.

Figure 3A:
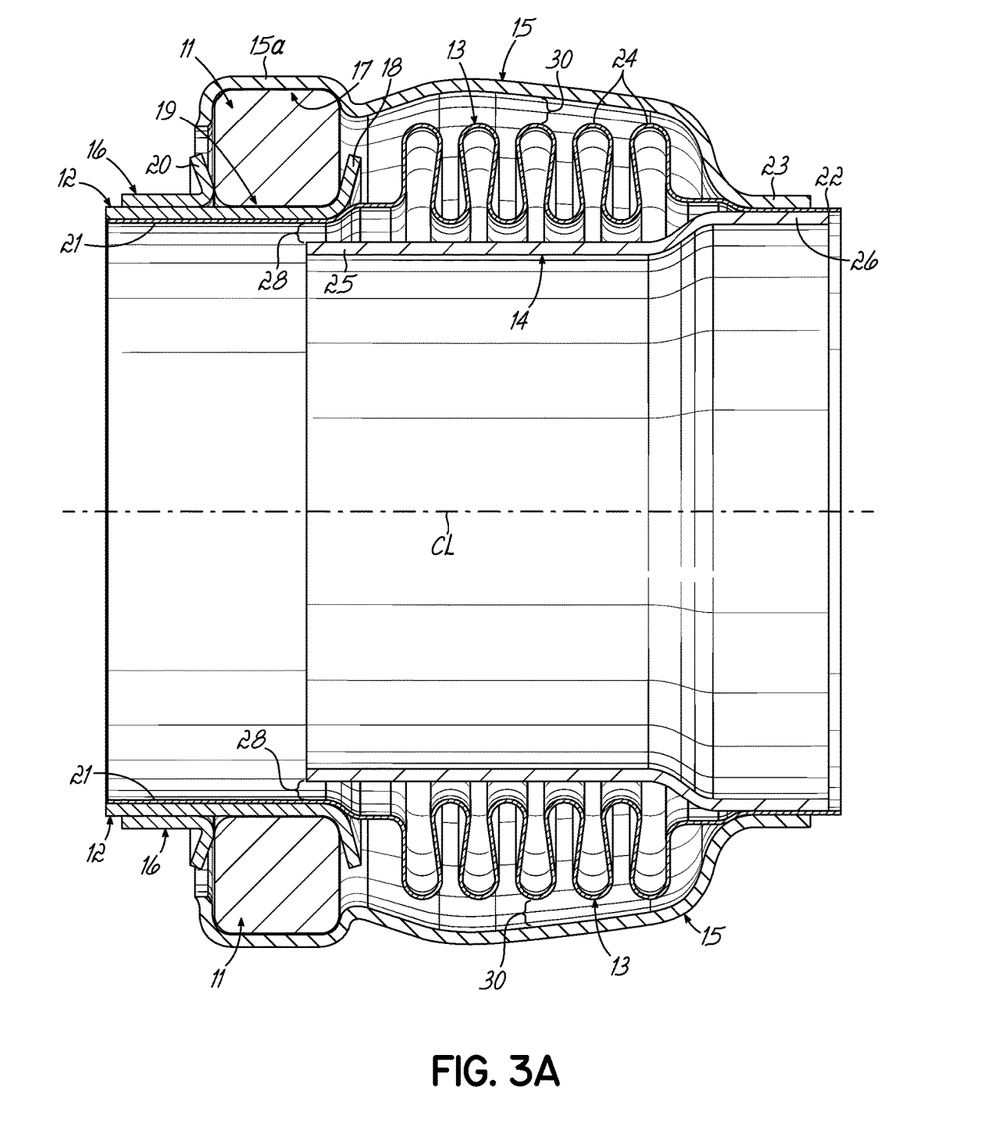
FIG. 3A is a full cross-sectional illustration of the invention in FIGS. 1-3.

On assembly, slide ring 16 has a radially outward extending flange 20 engaging damper 11, completing the pocket holding damper 11.

Figure 6:
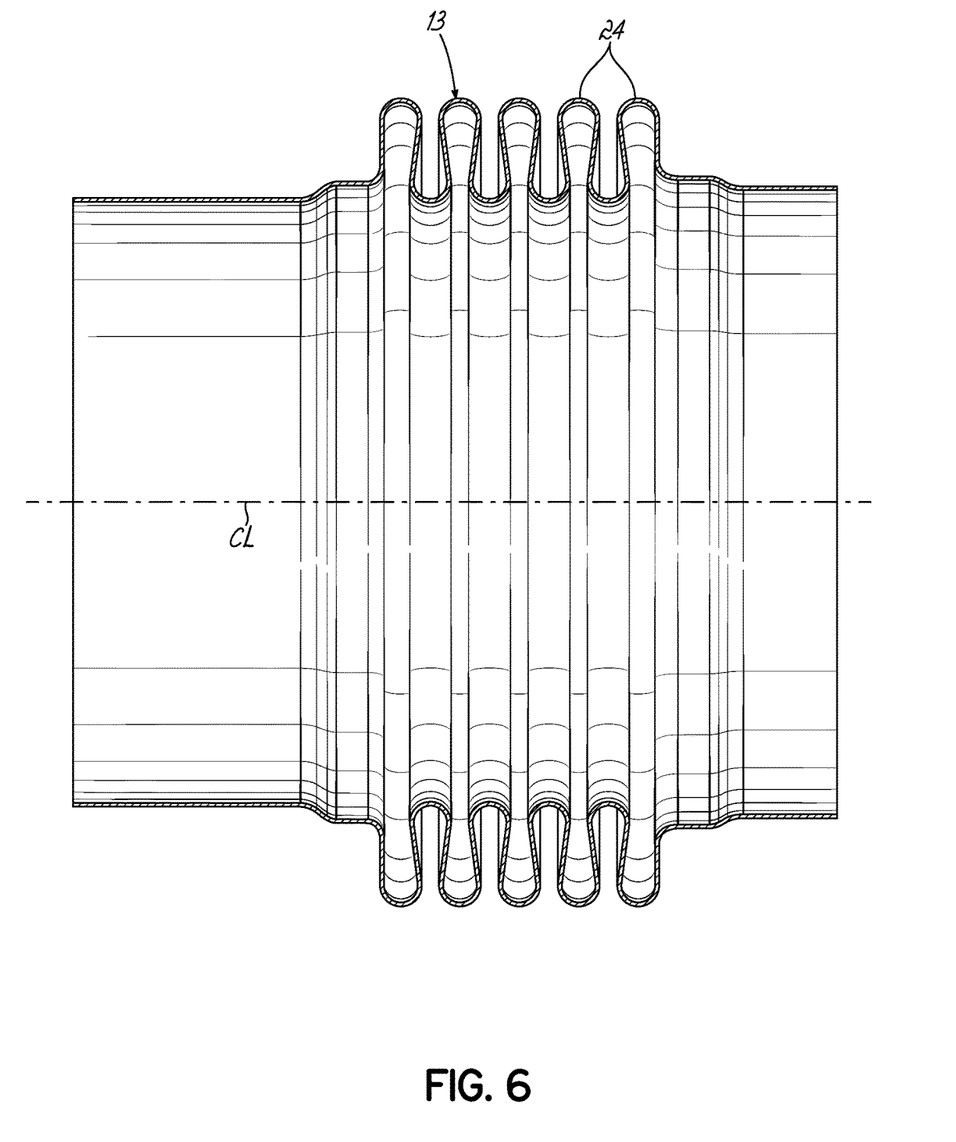
FIG. 6 is a cross-sectional view of the bellows of the decoupler in FIGS. 1-3.
Figure 7:
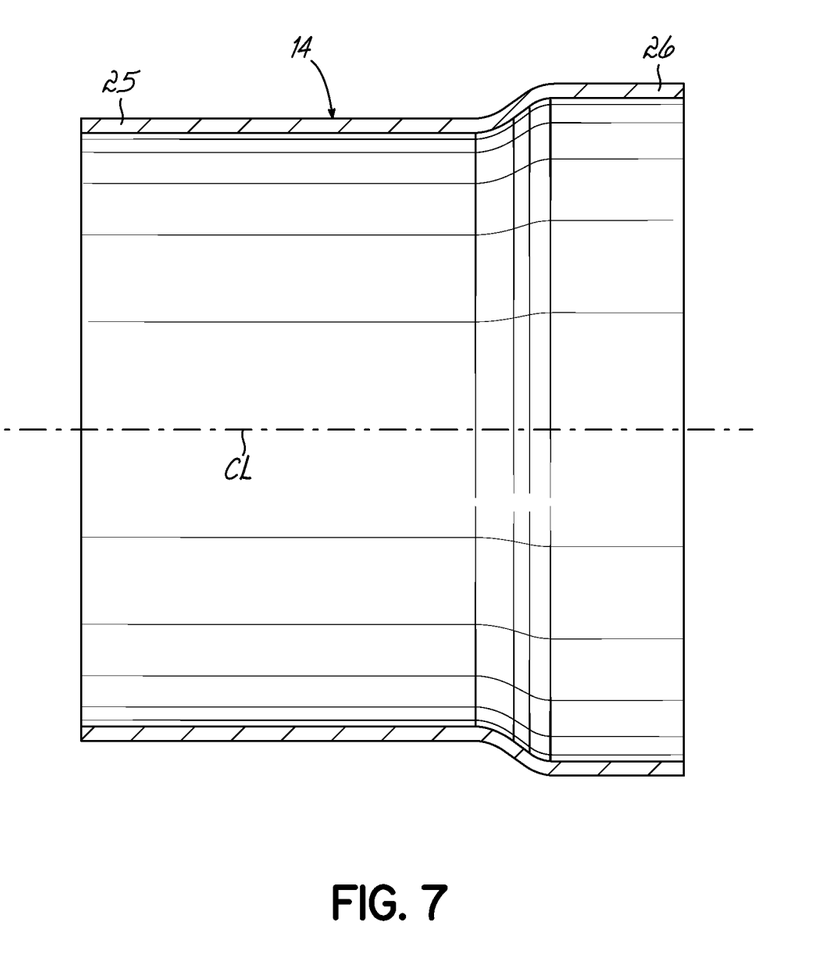
FIG. 7 is a cross-sectional view of the inner liner tube of the decoupler in FIGS. 1-3.
Figure 8:
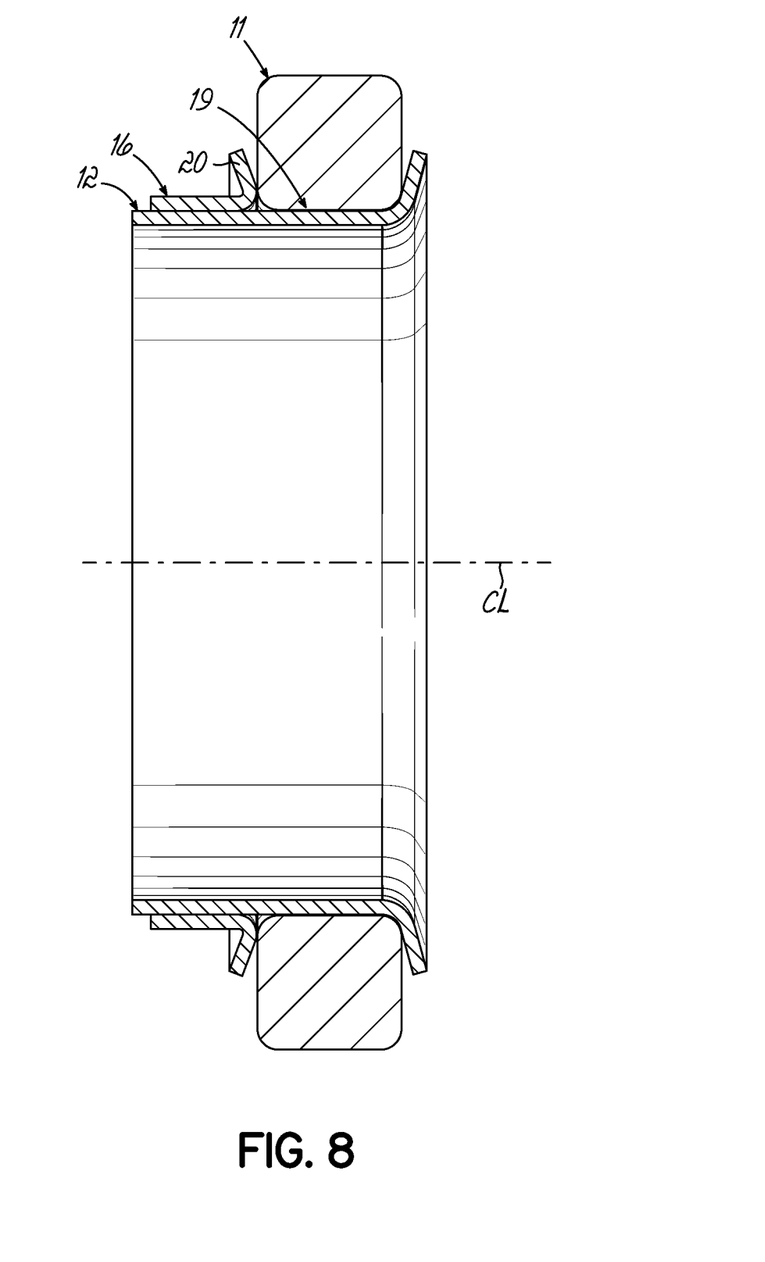
FIG. 8 is a cross-sectional view of the damper, inner damper ring and slide ring of the decoupler of FIGS. 1-3.
Figure 9:
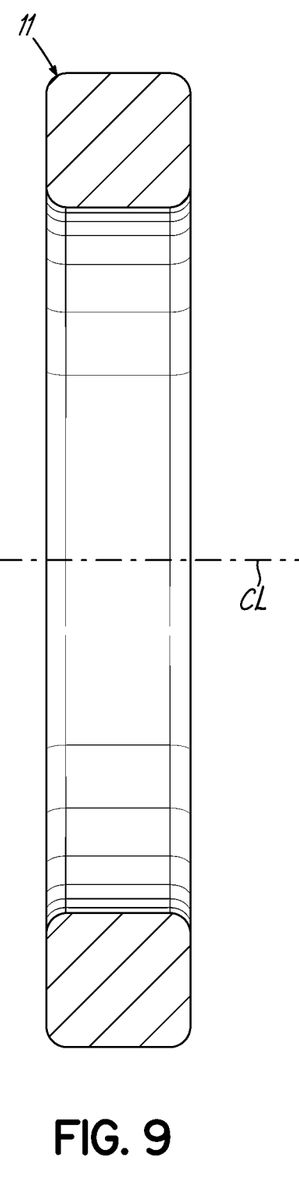
FIG. 9 is a cross-sectional view of the damper or cushion of FIG. 8.
Figure 10:
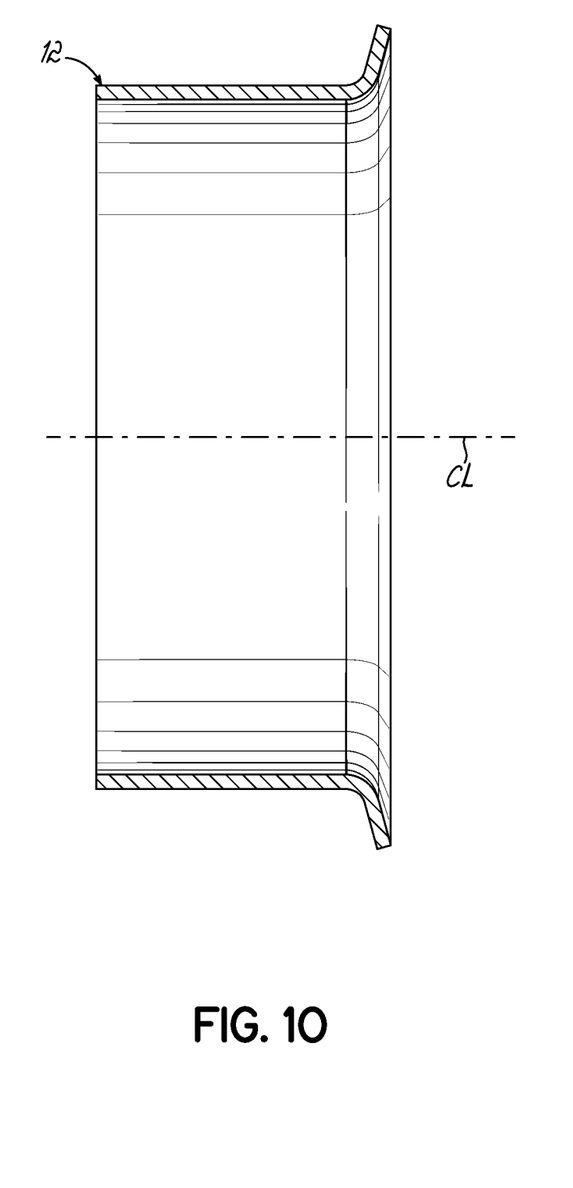
FIG. 10 is a cross-sectional view of the inner damper ring of FIG. 8.
Figure 11:
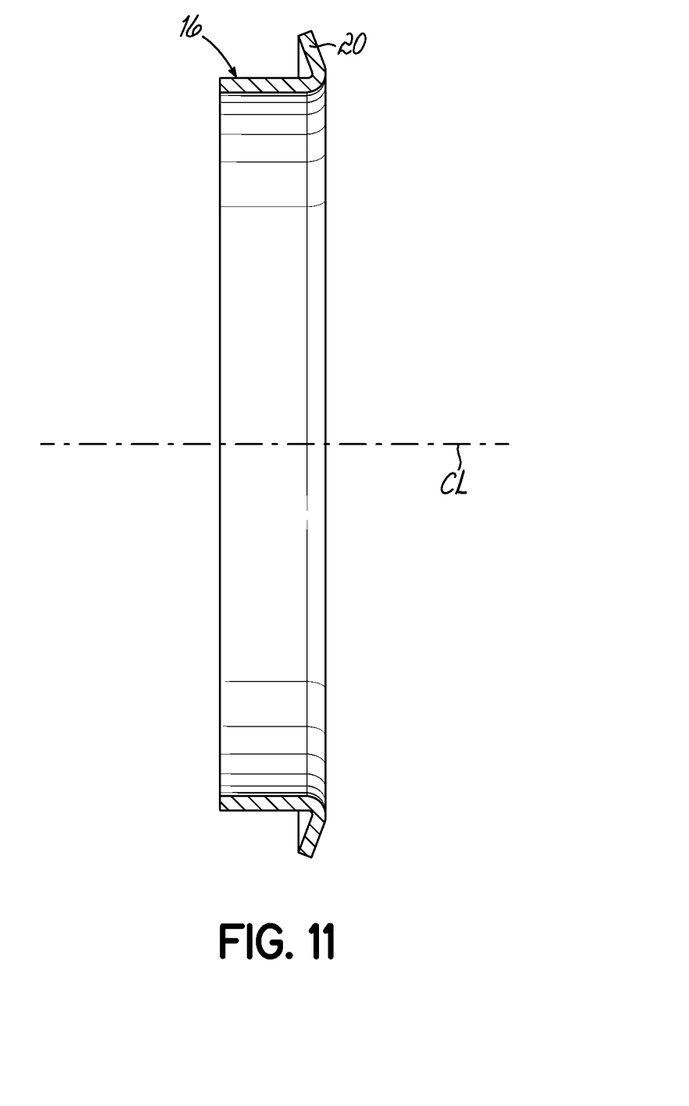
FIG. 11 is a cross-sectional view of the slide ring of FIG. 8.

Bellows 13 has one end 21 disposed under (or radially inward of) inner damper ring 12, and a distal end 22, disposed under end 23 of cover 15. Bellows 13 is preferably configured of a number of convolutions 24 (FIG. 6), preferably five in number as shown in this embodiment, although bellows 13 might have more or less convolutions.

Bellows 13 is thus relatively short and stiff as compared to a convoluted bellows of similar radial size and material but longer or of more convolutions as used in prior conventional couplings. This renders the first modes of decoupler 10 over-critical for typical NVH environments. In other words, the shorter, stiffer bellows of the invention is more resistant to high frequencies and eliminates high frequency fatigue failure.

One preferred form of bellows, for example only, is comprised of thin-wall austenitic stainless steel material with no more than ten and preferably only five or fewer convolutions on a pitch of about 1.5× convolution width. Any suitable form of bellows providing the desired stiffness to eliminate risk of high frequency fatigue failure resulting from the high frequencies typically resulting in such exhaust or intake systems is useable. Moreover, bellows of various size, including radial extent, can be used according to the invention.

Referring to the advantages of decoupler 10 respecting the noted frequency response, it will be appreciated prior couplers generally have low natural frequency modes that align with critical operating frequencies of the application in the range of 30 $h_z$ to 300 $h_z$ while the decoupler 10 described herein, does not align with the operating frequencies (called over-critical) in the range of 30 $h_z$ to more than 300 $h_z$. For this reason, resonance fatigue durability of the decoupler 10 is not of a concern.

Inner liner tube 14 as shown in the Figs. as a hollow, solid wall tube having one end 25 and a distal end 26 (FIGS. 3 and 3A) of somewhat greater diameter than tube 14 and end 25 at an upstream end of decoupler 10. It will appreciated that tube 14 is a solid wall tube as opposed to strip-wound or more porous liners of conventional couplings.

It will be appreciated end 22 of bellows 13 is sandwiched between liner 14 at end 26 and end 23 of cover 15, while end 25 of liner 14 is free-standing.

With further respect to FIG. 3 and FIG. 3A, note that air gaps 28, 30 are provided in decoupler 10. Air gap 28 is provided between liner 14 and inner convolutions of bellows 13. Air gap 30 is provided between outer convolutions of bellows 13 and cover 15.

Decoupler 10 is thus more thermally efficient in these respects than conventional couplers. As hot gas flows through decoupler 10, heat tends to radiate outwardly. Such heat transfer is diminished by air gaps 28, 30 and there is no conductive heat transfer outwardly through the convoluted portion of bellows 13 between its ends, that portion being disposed between the two air gaps.

Moreover, and due to the construction of decoupler 10, it will be appreciated that decoupler 10 does not tend to expand or elongate in the presence of anticipated high heat nor due to high internal gas pressures to the same extent as prior couplers with large bellows and without the noted air gaps. Thermal response of decoupler 10 to operational temperatures is thus diminished. As a result optional thermal insulating sleeves can easily be applied around decoupler 10 without specific accommodation made necessary by excessive expansion. This is demonstrated further in FIG. 12 respecting two decouplers 10, for example, covered by thermal insulating sleeve 35.

Figure 4:
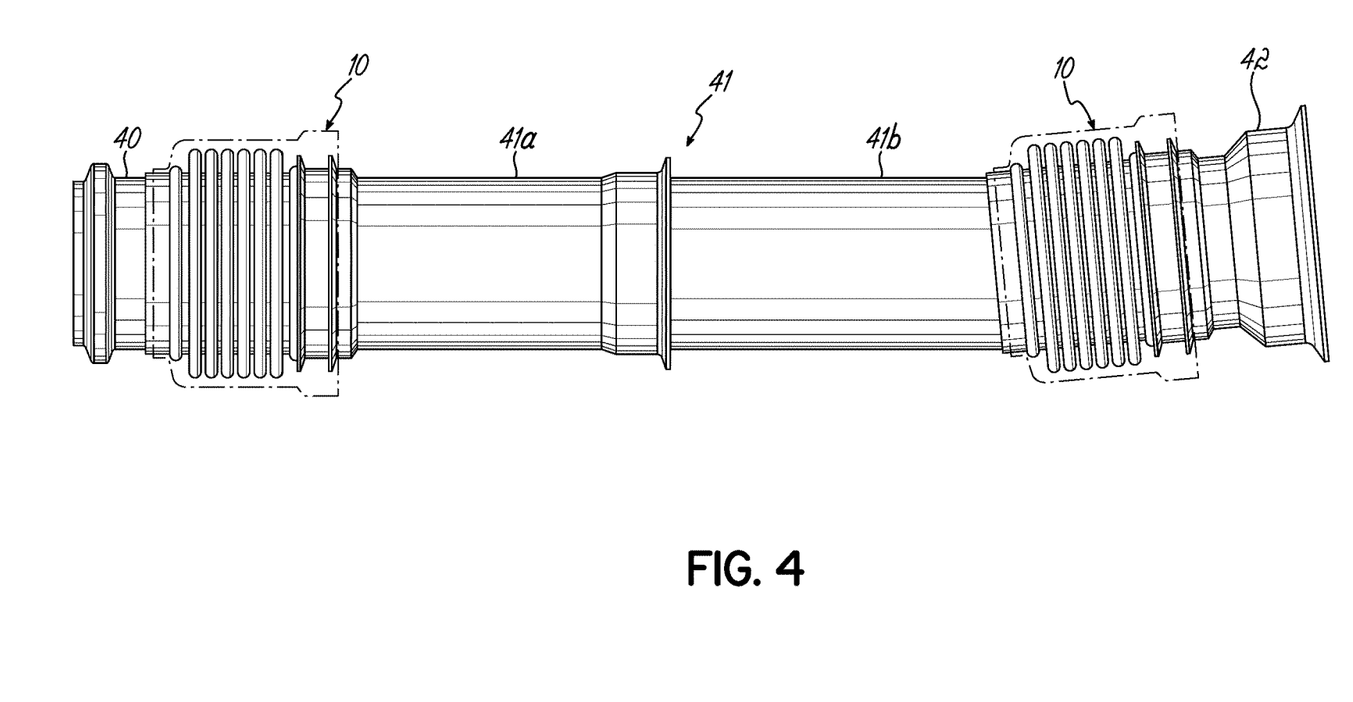
FIG. 4 is an illustration of two decouplers of FIGS. 1-3 in a series used to couple three pipes, and omitting the decoupler covers for clarity
Figure 5:
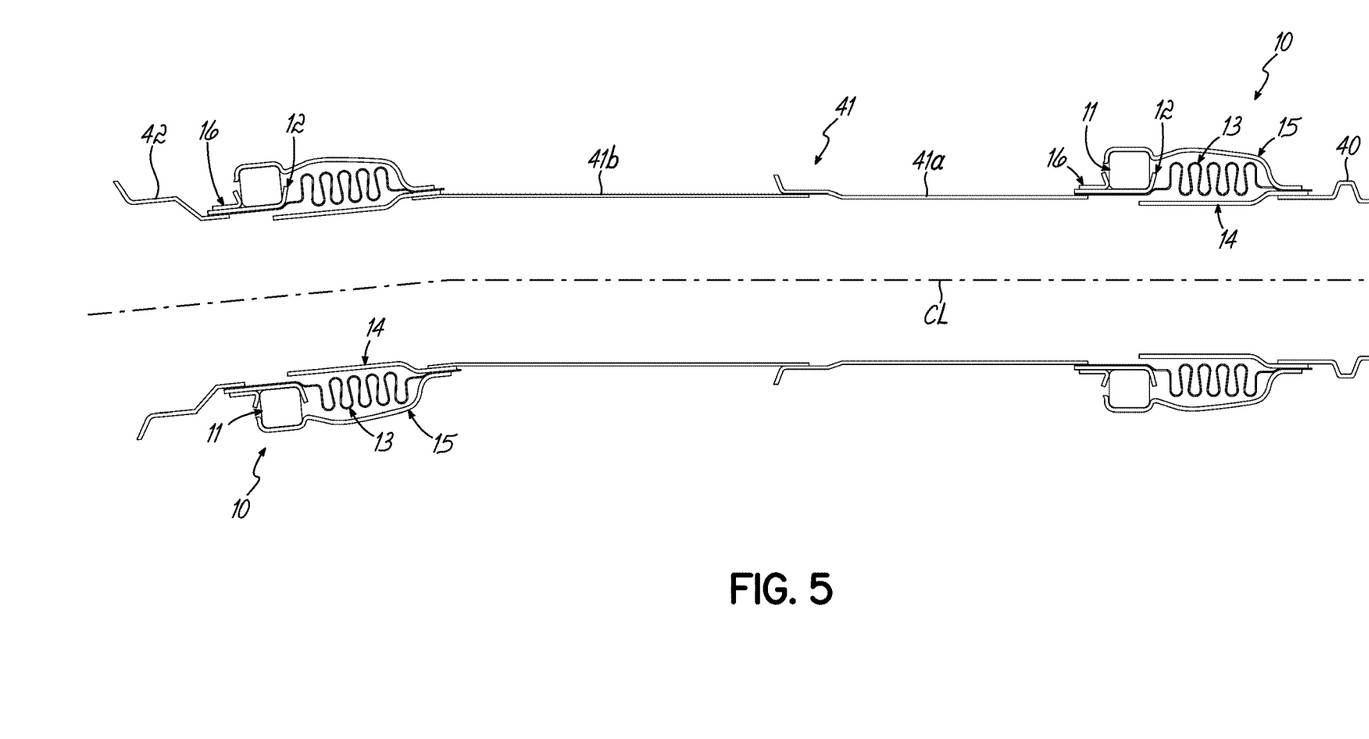
FIG. 5 is a cross-sectional illustration of the two decouplers as in FIG. 4.

Turning now to FIGS. 4 and 5, there is illustrated the use of two decouplers 10 in tandem, coupling three pipes 40, 41 (41a and 41b) and 42 in an exhaust or intake system. Pipe 41 may comprise two pipe parts 41a, 41b as shown. Such two decouplers 10 can be used in place of a single, prior known coupler or prior known flexible hose, thus to accommodate angular, axial and lateral displacements between two pipes or conducts 40, 42 and between pipes 40, 41b and 41a, 42 respectively.

Decoupler 10 can be used to couple co-axial pipes 41a, 40 as shown or co-axially diverse pipes 41b, 42, also as shown in the drawings.

Figure 12:
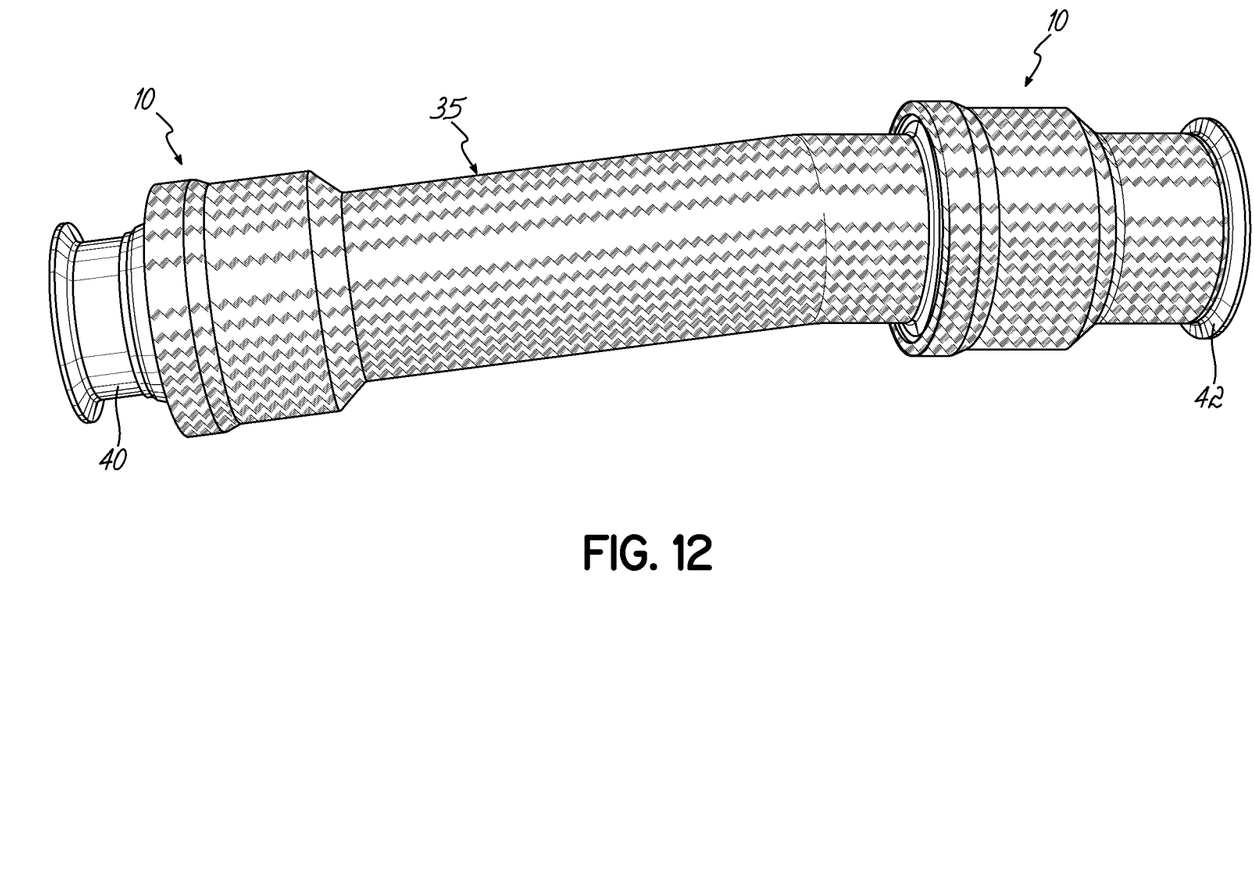
FIG. 12 is an illustration of the two decouplers as in FIGS. 4 and 5, provided with an exterior thermal insulating sleeve.

FIG. 12 illustrates the use of an optional thermal insulating sleeve 35 over two couplers 10 and intervening pipes as shown.

Thermal insulating sleeve 35 may be made of any suitable insulating material for this environment including: thermal socks, thermal wrap/tape, metal foil insulation blankets, fabric insulation blankets, or composite insulation coatings.

FIGS. 6-11 are provided herein to illustrate, in enlarged scale bellows 13 (FIG. 6), liner tube 14 (FIG. 7); assembly of damper 11, inner damper ring 12 and slide ring 16 (FIG. 8); damper 11 (FIG. 9); inner damper ring 12 (FIG. 10); and slide ring 16 (FIG. 11) for clarity, all as described above.

With further reference to damper or cushion 11, that damper is preferably formed from a compressed stainless steel wire mesh material of austenitic stainless steel compressed during assembly to a preferred density of about 1.0 $g/cm^3$ to about 5.0 $g/cm^3$.

The damper or cushion 11 can be adjusted to tune the decoupler 10 for specific system damping. This can be accomplished by either adjusting the cushion material density itself or by adjusting the pre-load force applied to the damper 11 by the slide ring as the components are assembled and prior to welding the slide ring 16 to inner dampening ring 12.

It will be further appreciated that the relatively stiffer and less thermably reactive decoupler 10 (as compared to prior couplers) does not grow in significant length when exposed to expected gas temperatures or high gas pressures. As a result, it is not necessary to use specially adapted mounts or fixtures at the coupler ends to resist such elongation.

Moreover, since decoupler 10 is load bearing it can be hung off the backside of a pipe or conduit with no special mounting fixtures or brackets for the decoupler.

In use it will be appreciated the decoupler 10 has an upstream end at ends 23 of cover 15, 22 of bellows 13 and 26 of liner 14, and a downstream end proximate inner damper ring 12 and free end 25 of liner 14. When used to operably connect two pipes, end-to-end, the upstream end of decoupler 10 is secured to one end of a pipe (40 in FIG. 5) with liner end 26 engaging around a pipe. The downstream end of the decoupler 10 is connected to an end of another second pipe with an end 21 of bellows 13 engaging around the end of the second pipe and end 25 of liner 14 remaining free-standing.

A number of benefits provided by the decoupler 10 of the invention include but are not limited to the following:

1. Load bearing joint: Unlike a conventional bellows that is non-load bearing, portions of the exhaust system can be hung from the decoupler and exhaust/intake system hangers/brackets can be eliminated 2. High pressure resistance: Unlike conventional bellows, high internal gas pressures do not cause the decoupler to grow in length or "squirm".

3. System damping: Unlike conventional bellows, the decoupler of this invention can dampen exhaust/intake system resonances (periphery) due to the high density cushion 11 which is composed of compressed stainless steel mesh captured by the cover 15.

4. Thermal retention: The decoupler 10 substantially retains exhaust gas heat for optimum ATD performance (two air gaps).

5. Thermal protection: The decoupler 10 substantially prevents radiation of heat to the periphery that could be damaged in the presence of excessive temperature, or which could cause safety concerns.

6. Easy to insulate (increase thermal retention): This decoupler 10 allows the installation of conventional "static" insulation that does not need to be flexible.

7. Harsh Environment Resistant: The thin-wall flexible bellow 13 (that creates leak-tight seal) is protected by the outer cover which is resistant to environmental debris impact as well as handling damage.

8. System Misalignment: The increased stiffness and load bearing characteristics or decoupler 10 promote proper assembly alignment in the factory without the use of an assembly fixture.

9. Less-complex liner: Compared to a conventional flex or spiral or strip wound hose, the short overall liner length allows for the use of a "static" liner (simple tube) vs. a strip-wound hose for bellow temperature control. This makes bellow to liner contact impossible even under harsh NVH inputs.

10. Over-critical Bellow Modes: The short stiff bellow 13 makes the 1$^{st}$ modes of the decoupler over-critical for typical NVH environments. High frequency fatigue failure risk is eliminated compared to conventional flexible couplings.

Finally it will be appreciated that certain of the Figures illustrate the invention about center lines, CL with the structures systematically oriented about such center lines.

These and other advantages and modifications of the invention will be readily appreciated by those of ordinary skill in the art and applicant intends to be bound only by the claims apprehended hereto.

What is claimed is:

1. A load bearing decoupler for coupling ends of pipes together and including:
   a damper,
   a liner in the form of a hollow, solid wall tube;
   a bellows having less than ten convolutions;
   a cover extending over said bellows and damper;
   said cover disposed around said bellows defining a space therebetween;
   said liner disposed interiorly of said bellows and defining a space between said liner and said bellows, further including an inner damper ring and a slide ring and wherein said cover and said inner damper ring and slide ring have opposed surfaces defining a pocket capturing said damper, and wherein said inner damper ring is configured for disposition around one of an exhaust or intake tube.

2. A decoupler as in claim 1 wherein said liner has an enlarged upstream end proximate one end of said bellows and a free-standing end proximate another end of said bellows.

3. A decoupler as in claim 2 wherein said enlarged end of said liner is engaged with an end of said bellows and said free-standing end of said liner is spaced from said bellows allowing independent motion therebetween.

4. A decoupler as in claim 1 wherein said damper is compressed between said cover and said inner damper ring and sliding ring.

5. A decoupler as in claim 4 further including said slide ring secured to said inner damper ring and holding said damper against said inner damper ring.

6. A decoupler as in claim 5 wherein said damper is adjustably compressible by movement of said slide ring against said damper and said inner damper ring.

7. A decoupler as in claim 1 wherein said bellows comprises five outer convolutions.

8. A decoupler apparatus in series orientation including two decouplers in series orientation, each including
   a damper,
   a liner in the form of a hollow, solid wall tube;
   a bellows having less than ten convolutions;
   a cover extending over said bellows and damper;
   said cover disposed around said bellows defining a space there between;
   said liner disposed interiorly of said bellows and defining a space between said liner and said bellows, further including an inner damper ring and a slide ring and wherein said cover and said inner damper ring and slide ring have opposed surfaces defining a pocket capturing said damper, and wherein said inner damper ring is configured for disposition around one of an exhaust or intake tube, and wherein each of said decouplers provide accommodation for angular axial and lateral displacement between two pipes or conduits.

9. A decoupler as in claim 8 wherein said bellows comprise five outer convolutions.

* * * * *